United States Patent [19]
Foster

[11] Patent Number: 5,857,140
[45] Date of Patent: Jan. 5, 1999

[54] CATALYTIC CONVERTER

[75] Inventor: Michael Ralph Foster, Columbiaville, Mich.

[73] Assignee: General Motors Corporation, Detroit, Mich.

[21] Appl. No.: 943,847

[22] Filed: Oct. 3, 1997

[51] Int. Cl.⁶ ................................... B01D 53/34
[52] U.S. Cl. ................ 422/179; 422/177; 422/180; 422/221; 422/222; 60/299
[58] Field of Search ................ 422/179, 221, 422/180, 222, 199, 177, 171, 174; 428/116, 592–594; 60/299, 300; 55/DIG. 30; 502/439

[56] References Cited

U.S. PATENT DOCUMENTS 3,189,418  6/1965  Gary ........................................ 422/180
5,330,728  7/1994  Foster ...................................... 422/177
5,449,500  9/1995  Zettel ...................................... 422/179
5,693,295  12/1997  Foster ..................................... 421/180

FOREIGN PATENT DOCUMENTS

1455351  11/1976  United Kingdom .

*Primary Examiner*—Hien Tran
*Attorney, Agent, or Firm*—Anthony Luke Simon

[57]  ABSTRACT

A catalytic converter in which a catalyst coated substrate is positioned within a housing and is constructed with end portions thereof extending into close proximity to the end members attached to the housing so as to improve the durability of a mat of intumescent material that is wrapped around and serving to support the substrate within the housing.

13 Claims, 8 Drawing Sheets

CATALYTIC CONVERTER

FIELD OF THE INVENTION

This invention concerns catalytic converters used for treating the exhaust gas of an internal combustion engine and, more particularly, to such converters having a catalyst coated substrate made of frangible material and supported by a mat of intumescent material within a sheet metal housing.

BACKGROUND OF THE INVENTION

One form of oval-shaped catalytic converter that is presently being manufactured and is used for treating the exhaust gas emitted by internal combustion engines includes an outer metallic housing which has a catalyst coated substrate located within the cavity of the housing. The substrate is wrapped with a mat of intumescent material which serves to support the substrate as well as provides an insulating barrier between the substrate and the housing. In addition, each end of the converter is provided with inner and outer cones which serve to reduce the (1) temperature of the outer end cone, (2) temperature of the mat retention material, and (3) transmission of noise through the end cone. In this type of converter, the mat material is used as the prime insulator and is used between the inner and outer end cones and between the substrate and the housing.

In an effort to simplify the manufacture and reduce the number of parts that are required, but not lose the advantages provided by catalytic converters of the type described above, it has been proposed in copending patent application U.S. Ser. No. 08/932,713, entitled "Catalytic Converter and Method of Manufacture," to eliminate the inner cone of the converter. By so doing, however, one finds that the mat is exposed directly to the hot exhaust gases. In order to allow the converter to be placed close to the engine where inlet exhaust gases reach as high as 950° C. without the hot gases causing the mat to erode and lose its substrate retention and heat insulating capability, the above-mentioned copending patent application discloses an catalytic converter construction and a method of making the converter that provides the mat with increased density along the minor axis. This change in mat density results in the mat being able to withstand the high temperatures caused by the hot exhaust gases much longer without deteriorating and losing its ability to serve as an insulator and as a support for the substrate within the housing.

This invention is directed to another form of catalytic converter of the above-described type that dispenses with the inner cone but is intended to provide the same advantages realized by the converters utilizing dual end cone construction. The intent here is to use integral portions of the substrate body and the end member to shield the mat from the direct impingement of the exhaust gases.

SUMMARY OF THE INVENTION

Accordingly, one object of the present invention is to provide a new and improved catalytic converter that includes a catalyst coated substrate designed so that at least a portion thereof extends towards an end member of the converter and cooperates therewith to form a chamber through which exhaust gas can flow.

Another object of the present invention is to provide a new and improved catalytic converter in which a catalyst coated substrate is positioned within a housing and is constructed with portions thereof extending into close proximity to the end members attached to the housing to improve the durability of a mat of intumescent material which is wrapped around the substrate and serves to support the substrate and prevent excessive heat transfer between the substrate and the housing.

A further object of the present invention is to provide a new and improved catalytic converter having a housing provided with a catalyst coated substrate and in which the substrate has the peripheral part of its inlet and outlet faces designed so that at least portions thereof project towards the associated end member of the housing to form a gas chamber therewith.

A still further object of the present invention is to provide a new and improved catalytic converter having a housing provided with a catalyst coated substrate and in which the housing is sealed at each end by an end member with the opposed gas inlet face and the gas outlet face of the substrate each being formed with a depression so that portions of the substrate are located in close proximity to the associated end member to form an inlet chamber and an outlet chamber.

A still further object of the present invention is to provide a new and improved catalytic converter having a housing provided with a pair of end members and having a catalyst coated substrate located therein with the inlet face and the outlet face of the substrate having a depression therein and in which the substrate is wrapped with a mat of intumescent material which extends along the length of the substrate up to the deepest point of the depression formed in the inlet and outlet faces of the substrate.

A still further object of the present invention is to provide and new and improved catalyst coated substrate which is adapted to be located in a housing and wrapped with a mat of intumescent material and which has portions thereof projecting from its inlet face and outlet face for shielding the mat to prevent erosion thereof when exposed to sufficiently high temperature exhaust gases.

A still further object of the present invention is to provide a new and improved catalyst coated substrate formed with a plurality of parallel flow passages extending from the gas inlet face to the gas outlet face of the substrate with the flow passages adjacent and along at least one part of the periphery of the substrate being of greatest length and the remaining flow passages being of lesser length as they approach the center of the associated face of the substrate.

A still further object of the present invention is to provide a new and improved catalyst coated substrate for a catalytic converter that is formed with parallel flow passages which extend from the inlet face to the outlet face of the substrate and in which the inlet and outlet faces are each formed with a depression therein allowing the inlet face to cooperate with the associated end member of the converter housing to form a gas chamber.

The above objects and others are realized in accordance with the present invention by a catalytic converter for the exhaust system of an internal combustion engine that, stated broadly, includes a housing having a cavity formed therein and having a gas inlet end and a gas outlet end. An inlet end member and an outlet end member, each having an opening for allowing exhaust gases to pass therethrough, are sealingly connected to the gas inlet end and the gas outlet end, respectively, of the housing. In addition, a catalyst coated substrate is covered with a mat of intumescent material and is located within the cavity and has a gas inlet face and a gas outlet face. Both the gas inlet face and the gas outlet face have integral projecting portions extending outwardly from their respective faces towards the associated end member and are located in close proximity thereto so as to form a gas chamber therewith while at the same time serving to shield the mat adjacent the projecting portions of the substrate from the hot exhaust gases of the engine.

In one form of the invention the gas inlet face and the gas outlet face each has the projecting portions extending outwardly along the entire periphery of its face towards the associated end member so, in effect, a depression is formed in its face that is concave in longitudinal cross section in both plan and elevation views. In another form of the invention, the gas inlet face and the gas outlet face are V-shaped when viewed in longitudinal cross section. In still another form of the invention, the gas inlet and gas outlet faces are inclined in longitudinal cross section when viewed in elevation. In each case, the catalyst substrate is wrapped with an intumescent material which serves to support the substrate within the cavity of the housing and, by having the gas inlet and outlet faces formed as described above, improves the durability of the mat while preventing excessive heat transfer between the substrate and the housing.

BRIEF DESCRIPTION OF THE DRAWINGS

Other objects, advantages, and features of the present invention will be more apparent from the following detailed description when taken in conjunction with the drawings in which.

DETAILED DESCRIPTION OF THE DRAWINGS

Referring to the drawings and more particularly to FIGS. 1–5 thereof, a catalytic converter 10, made according to the present invention, is shown for use in eliminating the undesirable constituents in the exhaust gases of an internal combustion engine. The catalytic converter 10 has an oval cross-sectional configuration providing a low profile configuration for installation under the vehicle floor or any other space-constrained location of the vehicle. As the description of the invention proceeds, it will become apparent that although all of the examples of the present invention are illustrated and will be described in connection with oval-shaped converters, the converter can have other cross sectional configurations such as round, square, rectangular, or some other cross sectional design and provide the advantages to be discussed hereinafter.

Figure 1:
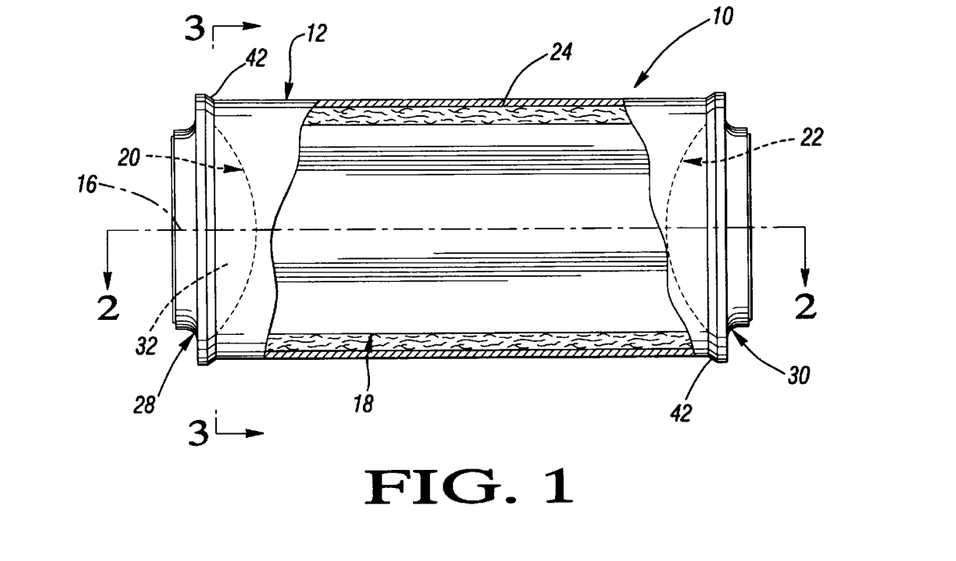
FIG. 1 is a side elevational view of a catalytic converter made according to the present invention with some parts broken away to show the interior of the converter.
Figure 2:
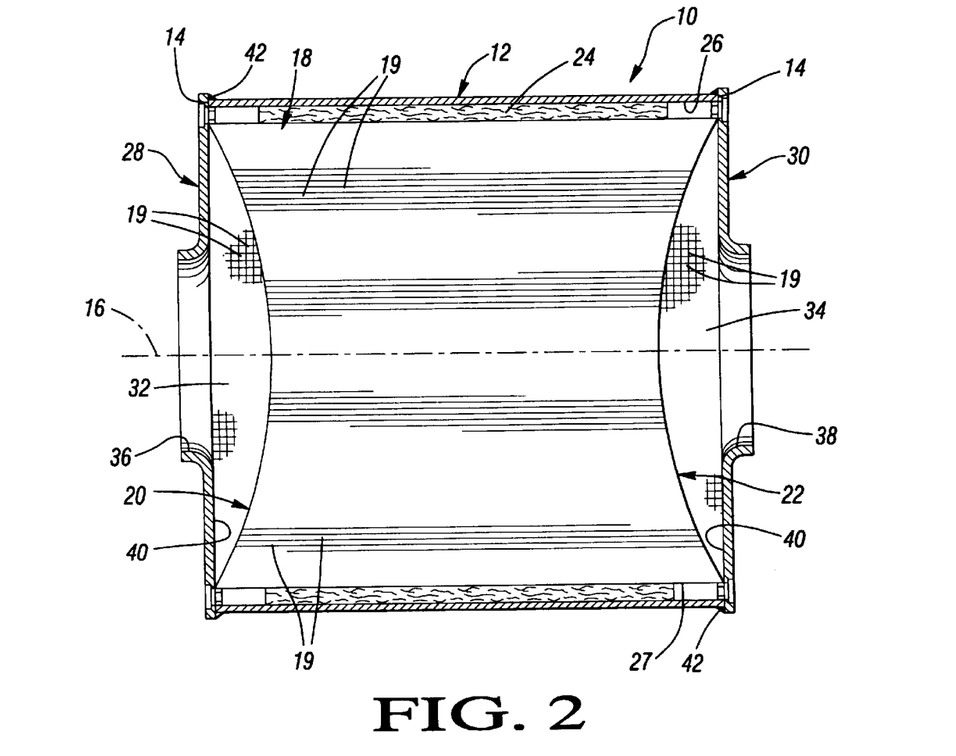
FIGS. 2 and 3 are sectional views taken on line 2—2 and line 3—3, respectively, of FIG. 1.
Figure 3:
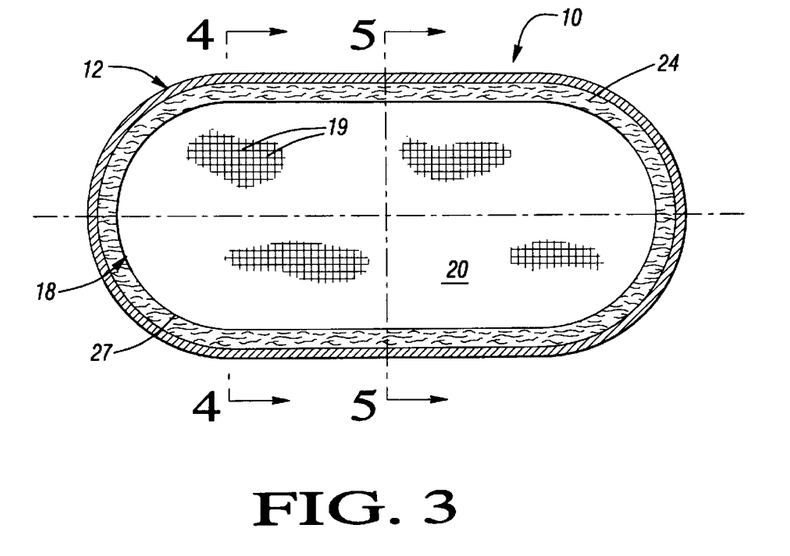

As seen in FIGS. 1–3, the catalytic converter 10 comprises an oval-shaped housing 12 which terminates at each end with an oval-shaped edge 14 defining an oval opening located in a plane extending transversely to the longitudinal center axis 16 of the housing 12. The housing 12 is made from a sheet of stainless steel or other material suitable for operation in a high temperature exhaust environment, and it provides a uniform oval cross-sectional cavity along its entire length. The cavity serves to enclose a monolith or substrate 18 made of a frangible material such as ceramic that is extruded with an identical honeycomb cross-section and an oval periphery. The ceramic substrate 18 is coated with a high surface area material and catalyzed with a precious metal such as platinum and/or palladium and/or rhodium. The catalyst serves to purify the exhaust gases exiting the internal combustion engine by entering the plurality of parallel flow passages 19 within the substrate 18 at the front inlet face 20 thereof and exiting the rear outlet face 22 thereof. The purification of the exhaust gases occurs by reduction and oxidation processes well known to those skilled in the art.

Figure 4:
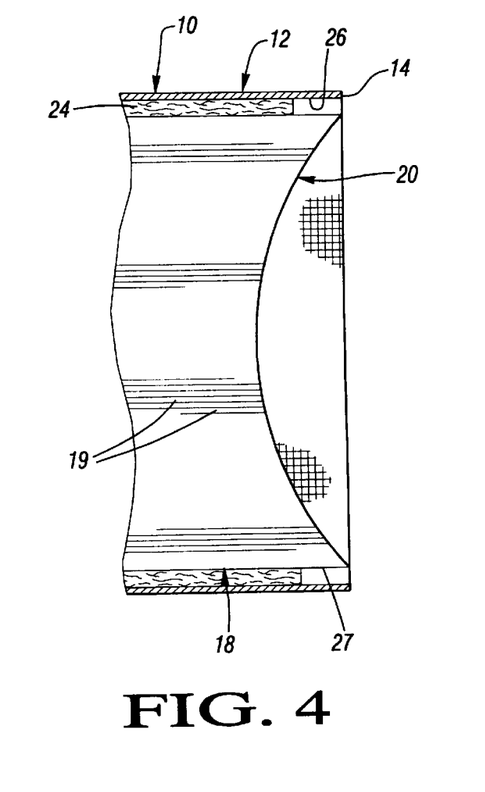
FIGS. 4 and 5 are sectional views taken on line 4—4 and line 5—5, respectively, of FIG. 3.
Figure 5:
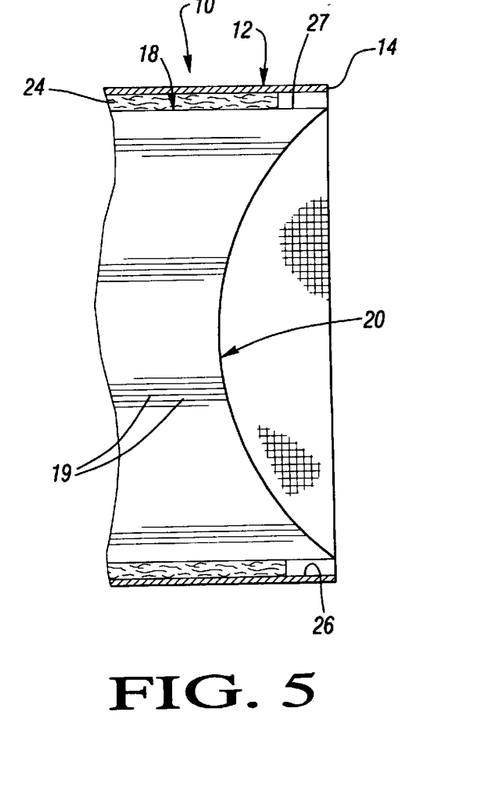

In this regard, it will be noted that the front inlet face 20 and the rear outlet face 22 of the substrate 18 are each formed with a depression for a purpose which will be explained more fully hereinafter. As seen in FIGS. 1, 4, and 5, the depression is concave in cross section when viewed in elevation. Similarly, the faces 20 and 22 are each generally concave in cross section in plan view as seen in FIG. 2. This configuration of the faces 20 and 22 provides integral portions of the substrate 18 that project outwardly from the body of the substrate 18 resulting in the longest flow passages 19 being located along the outer surface of the substrate 18. From this point, the flow passages 19 generally tend to progressively decrease in longitudinal length as they approach the center of the depression. Therefore, in effect, both the front inlet face 20 and the rear outlet face 22 each have a portion thereof scooped out to provide the concave depression in each of the faces 20 and 22.

As best seen in FIGS. 1–3, the substrate 18 is supported within the housing by a mat 24 in the form of an oval-shaped sleeve. The mat 24 is made from a resilient, flexible and heat expandable intumescent material such as that known by the trade name "Interam". The mat is manufactured by the Technical Ceramics Products Division of 3M Company of Minneapolis, Minn. The mat 24 is interposed between the inside surface 26 of the housing 12 and the outer surface 27 of the substrate 18. During assembly of the catalytic converter 10, the mat 24 is wrapped around the circumference of the substrate 18 and stuffed into the housing 12. During the stuffing operation, the mat 24 as well as the substrate 18 will be subjected to radially applied pressure about its circumference. In order to protect the fragile end portions of the substrate 18 that define the depressions within each face 20 and 22 from fracturing during the stuffing operation, the mat 24, as best seen in FIG. 2, extends from the deepest point of the depression in the front inlet face 20 to the deepest point of the depression in the rear outlet face 22 of the substrate 18. Thus, the longitudinal length of the mat 24 is less than the overall longitudinal length of the substrate 18.

The opposed open ends of the housing 12 are closed by an oval-shaped inlet end member or plate 28 and an identically formed outlet end member or plate 30. The inlet end member 28 cooperates with the depression in the inlet face 20 of the substrate 18 to provide an inlet chamber 32 while the outlet end member 30 cooperates with the depression in the outlet face 22 to provide an outlet chamber 34.

As seen in FIG. 2, the inlet end member 28 includes a circular inlet opening 36 defined by a radius transition adapted to be rigidly connected to cylindrical exhaust gas inlet pipe (not shown). Similarly, the outlet end member 30 has a circular outlet opening 38 provided with a radius transition adapted to be secured to a cylindrical exhaust gas outlet pipe (not shown) leading to the muffler (not shown) forming a part of the exhaust system in which the catalytic converter 10 is located. The end members 28 and 30 are essentially planar in configuration providing a flat inner surface 40 for engagement with the associated peripheral edge 14 of the oval opening at each end of the housing 12. Also, as shown, the end members 28 and 30 are located in parallel planes that are perpendicular to the longitudinal center axis 16 of the housing 12 and each of the end members 28 and 30 extends radially outwardly beyond the outside surface of the housing for accepting a weld 42 for securing the end member to the housing 12.

At this juncture, it should be noted that the peripheral portions of the substrate 18 defining the depressions in the inlet and outlet faces 20 and 22 can be in contact with or in very close proximity to the flat inner surface 40 of the associated end member. This then allows both the inlet and outlet chambers 32 and 34 are essentially sealed from the space surrounding the substrate 18 and occupied by the mat 24. Accordingly, the hot exhaust gases entering and leaving the converter 10 are restricted during flow to the inlet and outlet chambers 32 and 34 and the flow passages 19 within the substrate 18. In other words, the outwardly projecting peripheral portions of the inlet and outlet faces 20 and 22 shield the mat 24 as well as the housing 12 from the direct exposure to and the impingement of the hot exhaust gases. As a result, the converter 10 has an advantage over a comparable converter without the shielded mat 24 because converter 10 can be located closer to the engine where the inlet exhaust gases are at higher temperatures without the mat deteriorating and losing its ability to serve as an insulator and support for the substrate 18.

If desired, one could insulate the concave ends of the substrate 18 with a mat such as the mat 24, but of a lesser density than that of the mat 24. The added mat of lower density would be positioned at each end adjacent the mat 24, and serve to fill the area between the inside surface 26 of the housing 12 and the outer surface 27 of the substrate 18 surrounding the concave section thereof. The added mat should be of a density low enough so that during the stuffing operation alluded to hereinbefore, it will compress sufficiently within itself without transferring any excessive radially inwardly directed force to the concave sections that could cause the concave ends to fracture or break.

Figure 6:
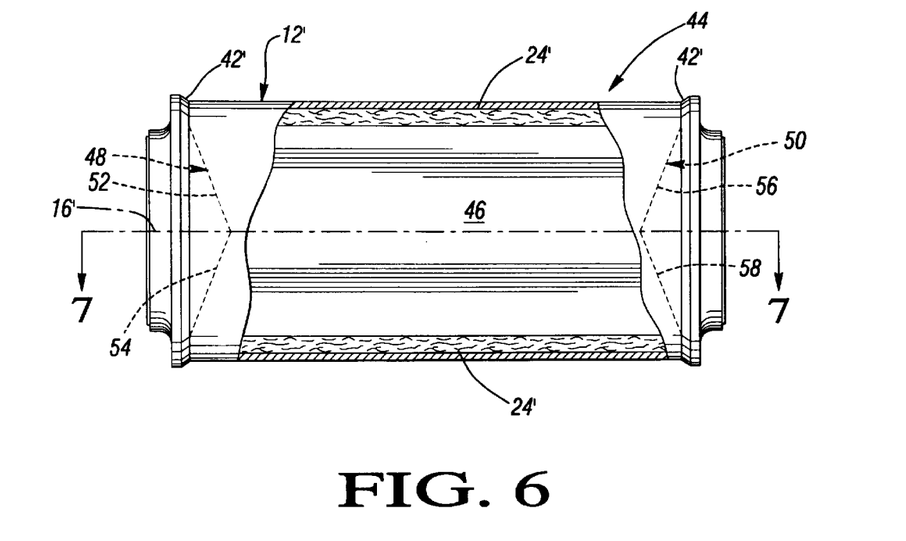
FIG. 6 is an elevational view of a modified catalytic converter with parts of the housing broken away.
Figure 7:
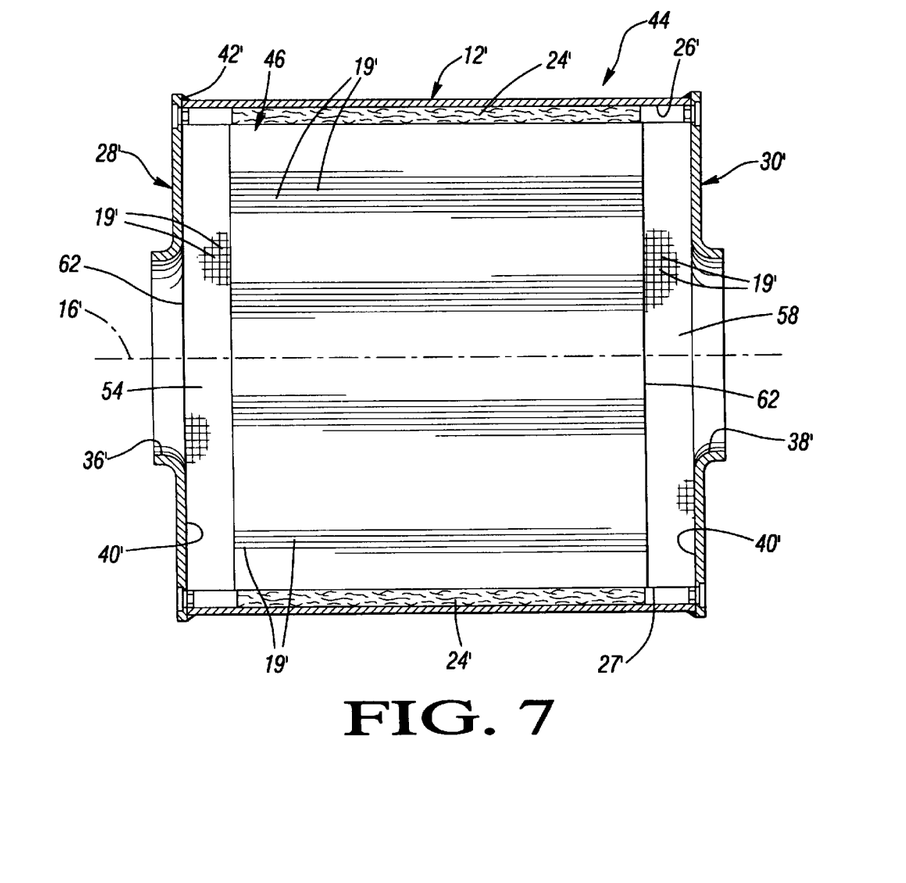
FIG. 7 is a sectional view taken on line 6—6 of FIG. 6.
Figure 8:
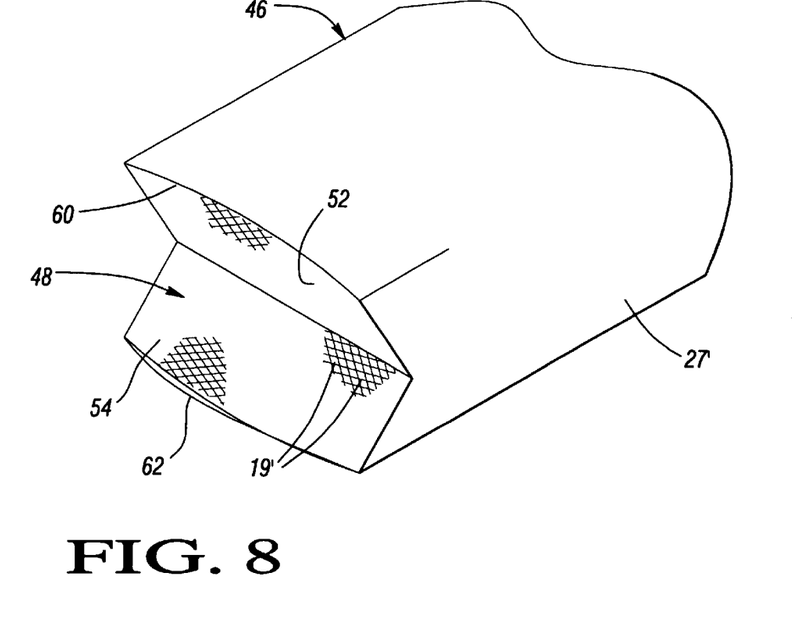
FIG. 8 is a perspective view of the front face of the catalyst substrate incorporated in the catalytic converter of FIGS. 6 and 7.

FIGS. 6–8 show a modified form of the catalytic converter 10 seen in FIGS. 1–5. The only difference in the catalytic converter 44 seen in FIGS. 6–8 over the converter of FIGS. 1–5 is in the configuration of the inlet and outlet faces of the substrate. Accordingly, parts of the catalytic converter 44 that are identical to the parts of the catalytic converter 10 are identified by corresponding reference numerals but primed.

As best seen in FIGS. 6 and 8, a catalyst substrate 46 has its inlet face 48 and its outlet face 50 formed with a depression which is V-shaped in cross section when viewed in elevation. This design provides a pair of flat inlet surfaces 52 and 54 and a pair of flat outlet surfaces 56 and 58, each pair of which intersect, as seen in FIG. 6, along a horizontal plane passing through the longitudinal axis 16'. As in the case of the catalytic converter 10, the mat 24' is wrapped around the circumference of the substrate 46 and, as seen in FIG. 7 extends along the length of the housing 12' up to the point of intersection between the inlet surfaces 52 and 54 and the outlet surfaces 56 and 58. By so doing, breakage of the projecting portions of the inlet and outlet faces 48 and 50 of the substrate is prevented during assembly of the converter as explained hereinbefore.

As should be apparent, the V-shape of the inlet and outlet faces 48 and 50 will serve to cooperate with the flat surface 40' of the associated end members 28' and 30' to provide an inlet chamber and an outlet chamber that will be triangular as viewed in FIG. 6. However, inasmuch as the projecting portions of the inlet and outlet faces 48 and 50 only have the upper and lower horizontally extending straight edges 60 and 62 (as seen in FIGS. 7 and 8) in contact with or in close proximity to the flat surfaces 40' of the associated end members, only the part of the mat 24' above and below these edges will be shielded from the hot exhaust gases. The part of the mat 24' located along the curved sides of the housing 12' will not be protected from the hot exhaust gases, but that need not be of major concern. The reason being that, in the manufacture of oval-shaped catalytic converters, it has been found that the mat density along the curved side walls is sufficient to serve as a seal and prevent erosion of the mat even when exposed directly to higher temperature exhaust gases. However, as explained more fully in the above identified co-pending patent application, there is a tendency for the mat located along the upper and lower elongated walls of the housing to have a lower mat density, which in turn limits the temperature of inlet exhaust gases to which the lower density portion of the mat may be exposed without eroding. Accordingly, it is more important to protect the mat along the upper and lower elongated walls of the housing and the V-shaped design of the inlet and outlet faces 48 and 50 accomplishes this result.

Figure 9:
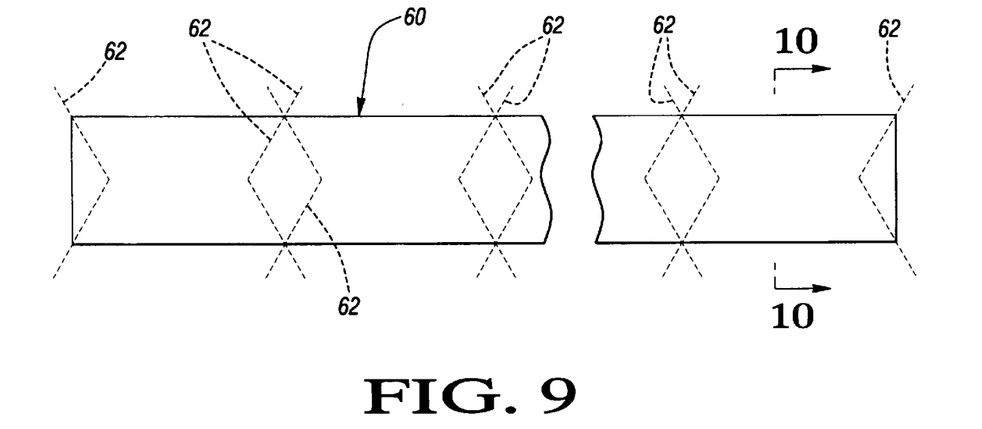
FIG. 9 is a side elevational view of an extruded oval-shaped catalyst substrate showing in dotted lines the cuts which can be made to provide a plurality of individual substrates for use in a catalytic converter of the type seen in FIGS. 6 and 7.
Figure 10:
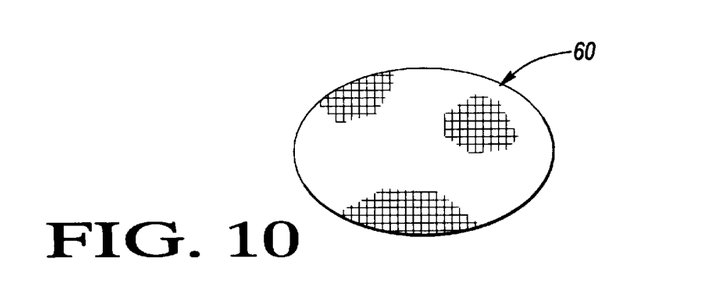
FIG. 10 is a cross-sectional view taken on line 10—10 of FIG. 9.
Figure 11:
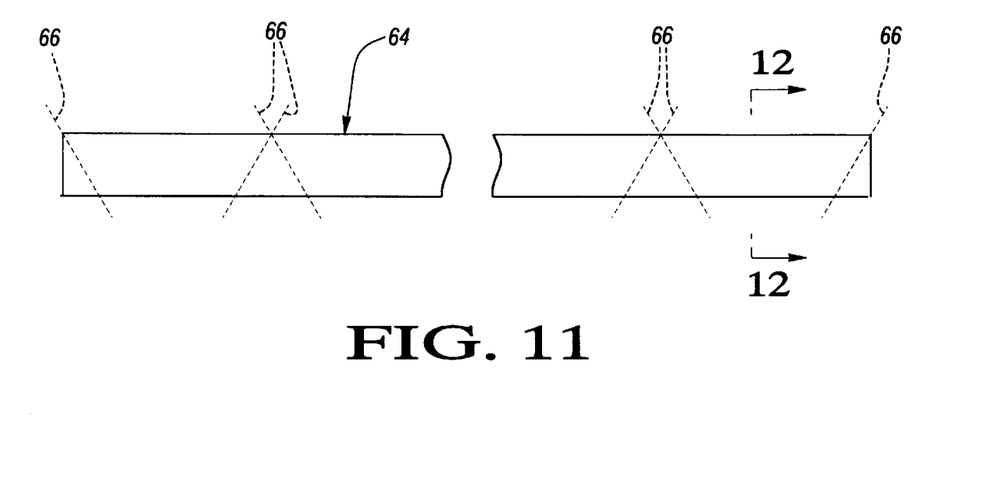
FIG. 11 is a side elevational view of another form of an extruded substrate and showing in dotted lines the cuts made for providing a plurality of substrates for the catalytic converter seen in FIGS. 6 and 7.
Figure 12:
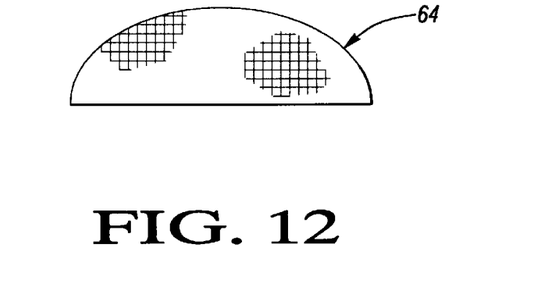
FIG. 12 is a cross sectional view taken on line 12—12 of FIG. 11.
Figure 13:
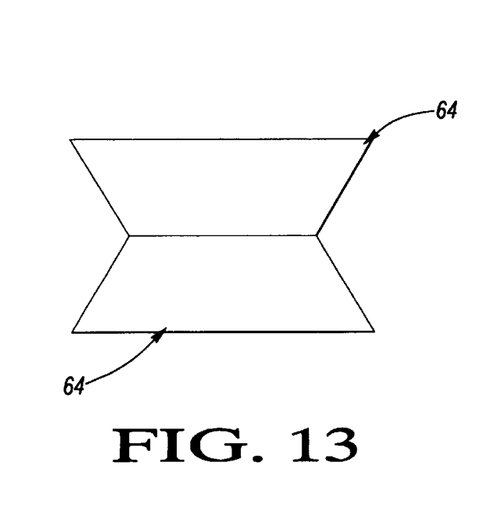
FIG. 13 shows two of the substrates cut from the extruded substrate seen in FIG. 11 combined to made a single substrate for the catalytic converter of FIGS. 6 and 7.
Figure 14:
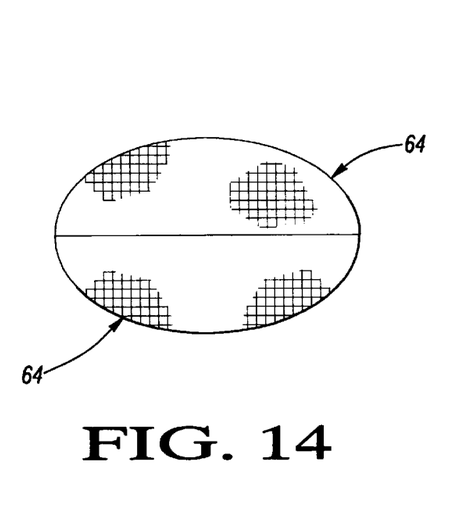
FIG. 14 is an end view of the substrate seen in FIG. 13.

With reference to FIGS. 9 and 10, an elongated brick 60 of extruded substrate is shown with the dotted lines 62 representing the cuts which would be made in the brick 60 in order to provide a substrate with V-shaped inlet and outlet faces such as shown in the catalytic converter 44 of FIGS. 6–8. On the other hand, FIGS. 11 and 12 disclose an elongated brick 64 of extruded substrate which is actually formed as a one-half portion of the substrate for the catalytic converter 44. In this instance, the brick 64 is cut as shown by the dotted lines 66 in FIG. 11 and, afterwards, the individual one-half substrates are combined in pairs, as seen in FIGS. 13 and 14, to provide a single substrate with V-shaped inlet and outlet faces.

Figure 15:
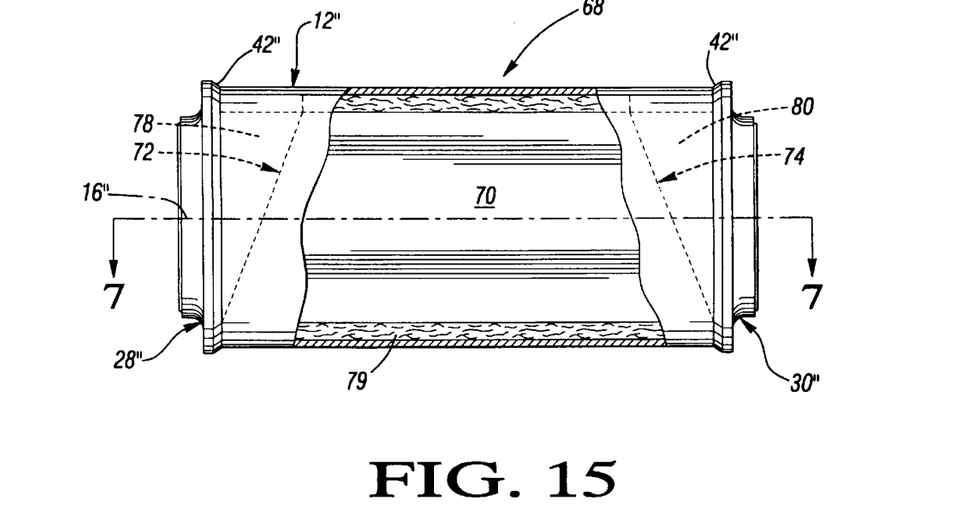
FIG. 15 is a side elevational view of a further modified version of a catalytic converter made in accordance with the present invention.
Figure 16:
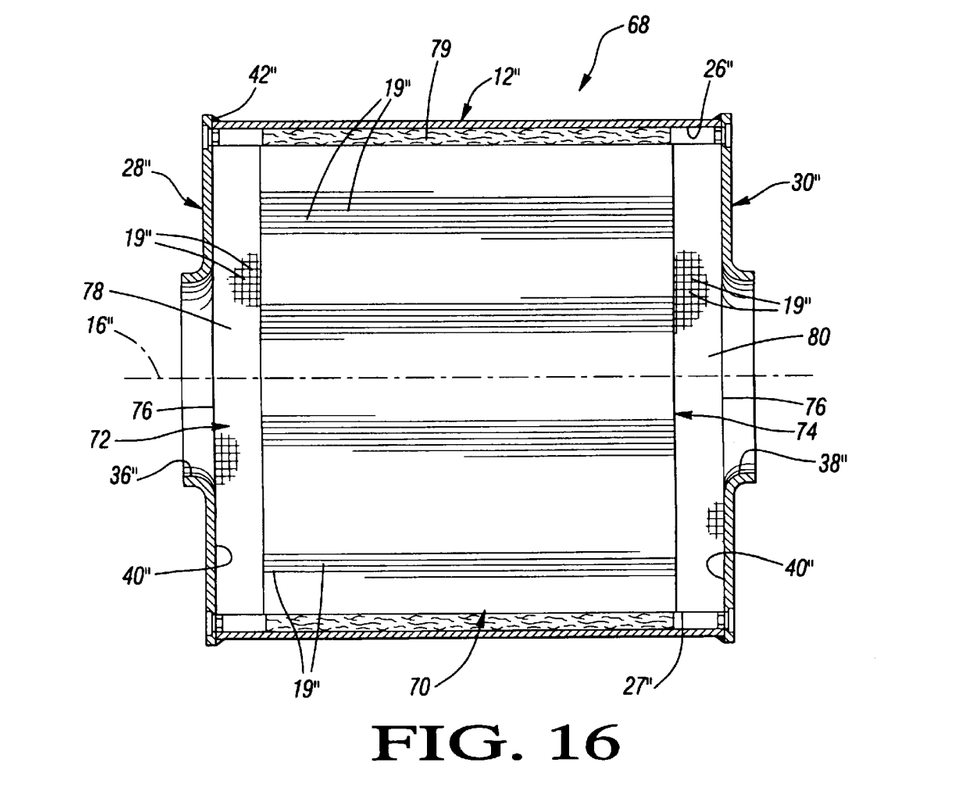
FIG. 16 is a sectional view taken on line 16—16 of FIG. 15.

Finally, FIGS. 15 and 16 illustrate a further modified version of the catalytic converters 10 and 44 described above. In this instance, the parts of this catalytic converter 68 that are identical to the parts of the catalytic converter 10 of FIGS. 1–5 are identified by corresponding reference numerals but double primed.

As seen in FIGS. 15 and 16, a catalyst substrate 70 is located within the housing 12" and has an inlet face 72 and an outlet face 74 each of which is located in a single plane that extends transversely to the longitudinal center axis of the housing 12". The lower straight edge 76 of each of the faces 72 and 74 is in contact or in close proximity to the flat surface 40" of the associated end member so as to shield the portion of the mat 79 of intumescent material extending along the lower wall of the housing 12". Beginning at the lower edge 76 of each face 72 and 74, the associated face is inclined inwardly relative to the end member so as to provide inlet and outlet chambers 78 and 80, respectively, each of which is triangular in configuration as seen in FIG. 15.

Obviously, the design of the substrate 70 of FIGS. 15 and 16 will provide protection for the mat 79 only along the lower wall of the housing 12". The mat 79 along the upper wall will be exposed to the hot exhaust gases of the engine. This problem, however, can be cured by having the catalytic converter 68 manufactured in accordance with one of the two methods disclosed in the aforementioned co-pending patent application. For present purposes it would suffice to say that the housing 12" together with the mat wrapped substrate located therein would be placed in a fixture and a compressive force applied to the housing 12" along the minor axis of the housing to deform the housing and increase the pressure and obtain a highly compressed mat along this axis. This would then be followed by securing the end members 28" and 30" to the opposed ends of the housing 12" while the compressive force is being applied. Once the compressive force would be relieved, the increased pressure would be maintained on the mat 79 along the top wall of the housing 12" and the increased density of the mat 79 would limit the eroding effect of the hot gases.

It will be noted that in many applications, it is required that the lower surface of the converter operate at a low temperature to meet thermal specifications of the vehicle manufacturer. The design of the substrate 70 of FIGS. 15 and 16 will provide an insulated lower surface to help maintain temperatures below the minimum specifications of vehicle suppliers.

Figure 17:
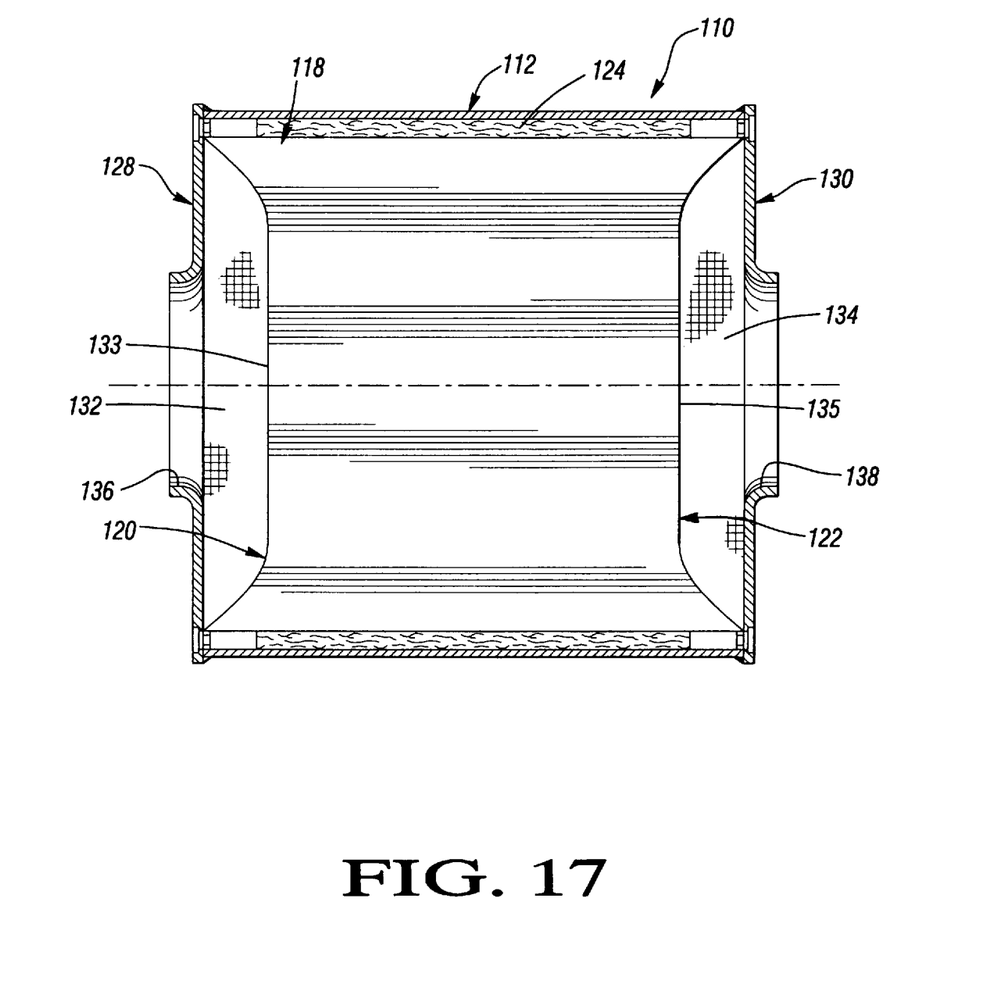
FIG. 17 is a sectional view of another example of a catalytic converter made in accordance with the present invention.

Referring now to FIG. 17, the catalytic converter 110 shown includes an oval-shaped housing 112, mat 124, substrate 118, inlet end member or plate 128 with circular inlet opening 136 and outlet end member or plate 130 with circular outlet opening 138, and is similar to the catalytic converter 12 shown in FIGS. 1–5 except as follows. The inlet and outlet faces 120 and 122 of the substrate 118 are each formed with a depression curved more steeply at the peripheral portions thereof to change the shape of the inlet and outlet chambers 132 and 134 compared to the shape of the inlet and outlet chambers 32 and 34 shown in FIG. 2. The front inlet face 120 and rear outlet face 122 in this example include substantially flat portions 133 and 135 radially interior of the peripheries of the front inlet face 120 and rear outlet face 122, providing each of the inlet and outlet chambers 132 and 134 with a generally bath tub-like shape. This shape of the inlet and outlet chambers 132 and 134 may be desirable to achieve improved exhaust gas flow distribution across the substrate 118 compared to the example shown in FIGS. 1–5.

Figure 18:
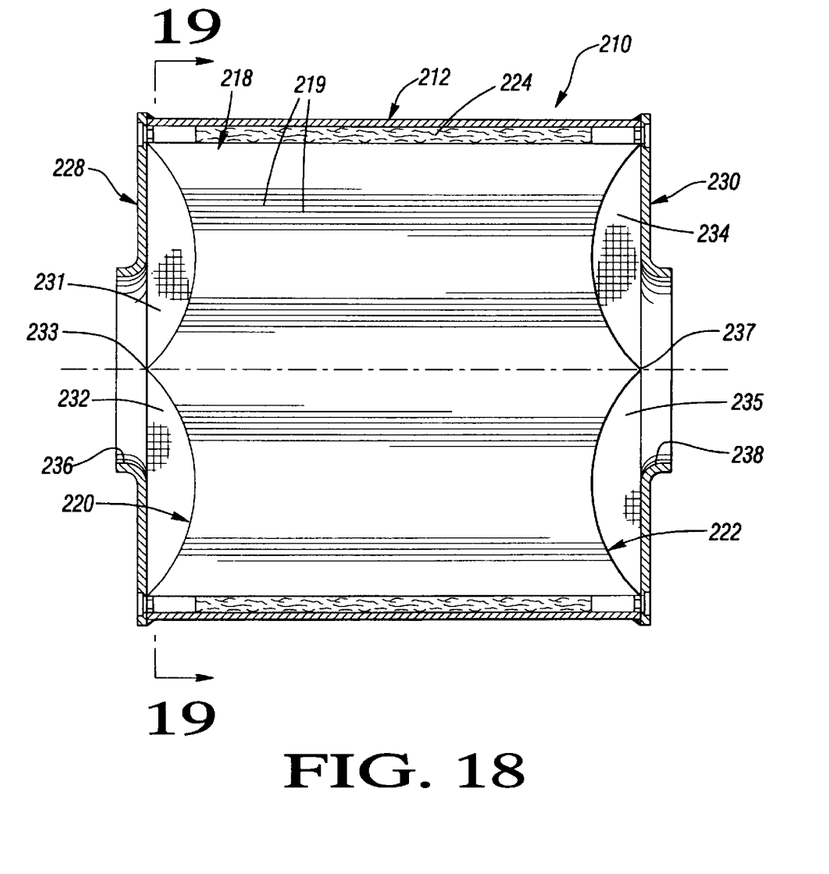
FIG. 18 is a sectional view of another example of a catalytic converter made in accordance with the present invention.
Figure 19:
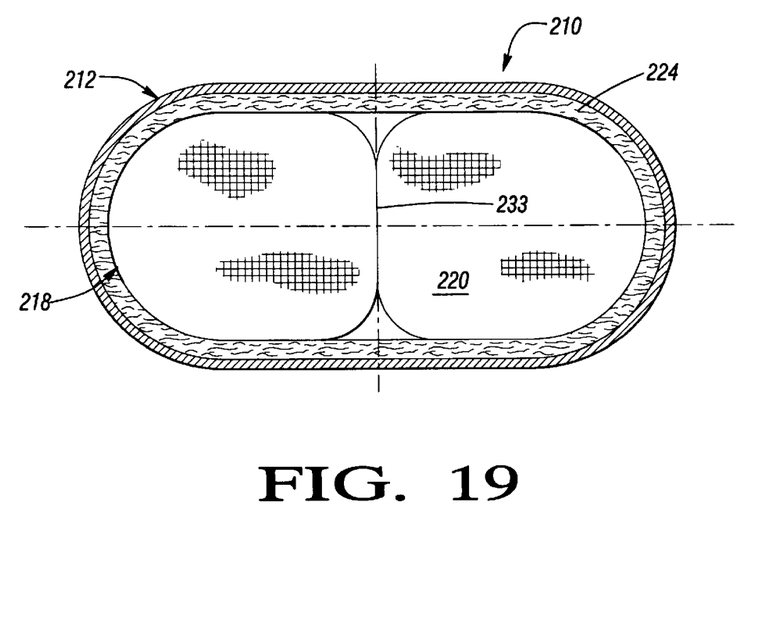
FIG. 19 is a sectional view taken on line 19—19 of FIG. 18.

Referring now to FIGS. 18 and 19, the example catalytic converter 210 shown includes an oval-shaped housing 212, mat 224, substrate 218, inlet end member or plate 228 with circular inlet opening 236 and outlet end member or plate 230 with circular outlet opening 238, and is also similar to the catalytic converter 12 shown in FIGS. 1–5. The inlet and outlet faces 220 and 222 of the substrate 218 are each formed with two depressions, divided by the central ridges 233 and 237 interconnecting opposite sides of the extended peripheries of the front inlet face 220 and the rear outlet face 222, respectively. The example structure shown provides two inlet chambers 231, 232 and two outlet chambers 234, 235. The flow passages 219 connecting the central ridges 233 and 237 are longer than the flow passages 219 connecting inlet chamber 231 to outlet chamber 234 and connecting inlet chamber 232 to outlet chamber 235.

Advantages of the example shown in FIGS. 18 and 19 includes increased substrate volume provided by the central ridges 233 and 237, allowing for increased catalyst content within catalytic converter 210. Alternatively, the same substrate volume as provided in the example converter of FIGS. 1–5 may be achieved with an incrementally shorter overall length for the catalytic converter 212. Additionally, the increase in flow restriction provided by the longer flow passages 219 connecting the central ridges 233 and 237 encourages exhaust gases to flow more evenly through the substrate 218.

In any of the above examples, the substrate may be shaped so that the chamber(s) is formed only at the inlet end thereof.

Various changes and modifications could be made to the above-described catalytic converters without departing from the spirit of the invention. Such changes are contemplated by the inventor and he does not wish to be limited except by the scope of the appended claims.

The embodiments of the invention in which an exclusive property or privilege is claimed are defined as follows:

1. A catalytic converter for use in an exhaust system of an internal combustion engine, said catalytic converter including a housing having a cavity formed therein and having a gas inlet end and a gas outlet end, a pair of end members, each of said end members having an opening for allowing exhaust gases to pass therethrough, one of said end members sealingly connected to the gas inlet end of said housing and the other of said end members sealingly connected to the gas outlet end of said housing, a catalyst coated substrate wrapped with a mat of intumescent material located within said cavity and having a body, a gas inlet face and a gas outlet face, said gas inlet face and said gas outlet face each having integral portions thereof extending outwardly from the body towards the associated end member and being in proximity thereto so as to form a gas chamber therewith that is essentially sealed from at least a portion of said mat to shield the portion of said mat from the exhaust gases of said engine.

2. The catalytic converter of claim 1 wherein said portions extend outwardly from said body along the entire periphery of said gas inlet and gas outlet faces towards said associated end member.

3. A catalytic converter for use in an exhaust system of an internal combustion engine, said catalytic converter including a housing having a cavity formed therein and having a gas inlet end and a gas outlet end, a pair of end members, each of said end members having an opening for allowing exhaust gases to pass therethrough, one of said end members sealingly connected to the gas inlet end of said housing and the other of said end members sealingly connected to the gas outlet end of said housing, a catalyst coated substrate located within said cavity and having a gas inlet face and a gas outlet face, said gas inlet face and gas outlet face each having a depression formed therein which cooperates with the associated end member to form a gas chamber therewith, wherein said depression is concave in cross section.

4. A catalytic converter for use in an exhaust system of an internal combustion engine, said catalytic converter including a housing having a cavity formed therein and having a gas inlet end and a gas outlet end, a pair of end members, each of said end members having an opening for allowing exhaust gases to pass therethrough, one of said end members sealingly connected to the gas inlet end of said housing and the other of said end members sealingly connected to the gas outlet end of said housing, a catalyst coated substrate located within said cavity and having a gas inlet face and a gas outlet face, said gas inlet face and gas outlet face each having a depression formed therein which cooperates with the associated end member to form a gas chamber therewith, wherein said depression is V-shaped when viewed in longitudinal cross section.

5. A catalytic converter including a housing having a cavity formed therein and having a gas inlet end and a gas outlet end, a pair of end members, each of said end members having an opening for allowing exhaust gases to pass therethrough, one of said end members sealingly connected to the gas inlet end of said housing and the other of said end members sealingly connected to the gas outlet end of said housing, and a substrate adapted to be coated with a catalyst and used in an internal combustion engine exhaust system, said substrate wrapped with a mat material and located within said cavity, said substrate having a plurality of flow passages formed therein, wherein the plurality of flow passages comprises a first set of the flow passages and a second set of the flow passages, all of said plurality of said flow passages being parallel to each other and extending from a gas inlet face to a gas outlet face of said substrate with the first set of the flow passages being adjacent and along at least one part of a periphery of the substrate and being longer than the second set of the flow passages, wherein the second set of said flow passages is along at least a central part of the substrate, and the first set of said flow passages extends beyond the second set of the flow passages and in proximity to at least one of the first and second end members so the second set of the flow passages cooperates with the one of the first and second end members to form a gas chamber therewith that is essentially sealed from at least a portion of said mat material to shield the portion of said mat material from exhaust gases.

6. The catalytic converter of claim 5 wherein said second set of flow passages are of lesser length as they progress from the first set of flow passages at said periphery towards a center of said substrate so as to form a depression in one of the gas inlet face and the gas outlet face.

7. The catalytic converter of claim 6 wherein said depression is concave when viewed in longitudinal cross section.

8. The catalytic converter of claim 6 wherein said depression is V-shaped when viewed in longitudinal cross section.

9. The catalytic converter of claim 6 wherein said first set of flow passages are adjacent the entire periphery of the substrate.

10. A catalytic converter for use in an exhaust system of an internal combustion engine, said catalytic converter including a housing having a cavity formed therein and having a gas inlet end and a gas outlet end, a pair of end members, each of said end members having an opening for allowing exhaust gases to pass therethrough, one of said end members sealingly connected to the gas inlet end of said housing and the other of said end members sealingly connected to the gas outlet end of said housing, a catalyst coated substrate wrapped with a mat of intumescent material located within said cavity and having a plurality of parallel passages through which the exhaust gas from said internal combustion engine is adapted to flow and be treated by said substrate, wherein the plurality of flow passages comprises a first set of the flow passages along at least one part of a periphery of the substrate and a second set of the flow passages on at least a central part of the substrate, wherein each passage of the plurality of parallel passages has a longitudinal axis, said substrate having a body, a gas inlet face and a gas outlet face, at least a first set of said passages being of a greater length than a second set of said passages, so as to allow said first set of said passages to project outwardly from the body into proximity to said one of said end members to thereby form a gas inlet chamber therewith that is essentially sealed from at least a part of said mat to shield the part of said mat from the exhaust gases from said engine.

11. The catalytic converter of claim 10 wherein said gas inlet face and said gas outlet face are inclined relative to the longitudinal axes of said passages.

12. A catalytic converter for use in an exhaust system of an internal combustion engine, said catalytic converter including a housing having a cavity formed therein and having a gas inlet end and a gas outlet end, a pair of end members, each of said end members having an opening for allowing exhaust gases to pass therethrough, one of said end members sealingly connected to the gas inlet end of said housing and the other of said end members sealingly connected to the gas outlet end of said housing, a catalyst coated substrate wrapped with a mat material located within said cavity and having a body, a gas inlet face and a gas outlet face, at least one of said gas inlet face and said gas outlet face having an integral portion thereof extending outwardly from the body towards one of the end members and being in proximity thereto so as to form a gas chamber therewith that is essentially sealed from at least a portion of said mat material to shield the portion of said mat material from the exhaust gases of said engine.

13. A catalytic converter according to claim 12, also including a central ridge extending outwardly from the body towards said one of the end members, wherein the central ridge interconnects opposite sides of the integral portion.

* * * * *